United States Patent [19]

Malofsky

[11] 4,007,323
[45] Feb. 8, 1977

[54] INITIATOR FOR ANAEROBIC COMPOSITIONS

[75] Inventor: Bernard Miles Malofsky, Bloomfield, Conn.

[73] Assignee: Loctite Corporation, Newington, Conn.

[22] Filed: Oct. 28, 1975

[21] Appl. No.: 626,145

[52] U.S. Cl. .............................. 526/312; 526/216; 526/220; 526/224; 526/225; 526/227; 526/230; 526/231; 526/232; 526/320; 526/328; 428/463

[51] Int. Cl.² ........................................ C08F 120/20

[58] Field of Search ................ 260/89.5 R, 89.5 A, 260/89.5 N; 526/312, 320, 328

[56] References Cited

UNITED STATES PATENTS 3,775,385 11/1973 Ozono et al. ................ 260/89.5 A
3,795,641 3/1974 Lees et al. .................... 260/89.5 R

*Primary Examiner*—Harry Wong, Jr.
*Attorney, Agent, or Firm*—Jean B. Mauro

[57] ABSTRACT

An initiator, particularly useful for anaerobic compositions and replacing the commonly used hydroperoxides, having the formula

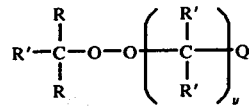

In a preferred embodiment, R is a lower alkyl group, and R' is hydrogen and Q is a hydroxyl group.

20 Claims, No Drawings

INITIATOR FOR ANAEROBIC COMPOSITIONS

BACKGROUND OF THE INVENTION

1. Field of the Invention

This invention relates to the use of certain substituted organic peroxides containing a polar group as initiators in anaerobic curing adhesive and/or sealant compositions.

2. Prior Art

Adhesive and sealant compositions based on acrylate, e.g., methacrylate, monomers polymerizable by free-radical initiation are known in the art. Likewise, anaerobic compositions are known in the art (see, for example, U.S. Pat. Nos. 2,895,950, 3,043,820, and 3,218,305). Anaerobic compositions are characterized by their ability to remain liquid in the presence of air, but cure to a strong adhesive bond when air is excluded, as by assembling a mated nut and bolt to which the composition has been applied.

While anaerobic monomers were initially limited to alkylene glycol diacrylates, more recently urethane-acrylate monomers, such as are disclosed by Gorman et al. in U.S. Pat. No. 3,425,988, have been developed. These materials may be regarded as the reaction product of a polyisocyanate (e.g., toluene diisocyanate) with a mono-acrylate having a reactive hydrogen atom in the alcoholic portion thereof (e.g., hydroxypropyl methacrylate).

Various other urethane-acrylate-type monomers have been developed more recently by Baccei. One of these monomers, described in copending application Ser. No. 546,250, filed Feb. 3, 1975, comprises a urethane-acrylate-capped polybutadiene polyol or polyamine. Another related monomer, described in copending application Ser. No. 557,740, filed Mar. 12, 1975, and now abandoned, comprises a urethane-acrylate-capped poly(methylene)ether polyol. Still another related monomer, described in copending application Ser. No. 557,564, also filed Mar. 12, 1975, comprises a urethane-acrylate-capped vinyl grafted poly(alkylene) ether polyol.

Still other anaerobic monomers utilizing hydroperoxide cure initiators are disclosed in U.S. Pat. Nos. 3,720,656, 3,631,154 and 3,651,036.

Methods of using anaerobic system are disclosed in the references mentioned above, as well as in U.S. Pat. Nos. 3,547,851, 3,625,875 and 3,672,942, copending application serial number 356,679, filed May 2, 1973, and now abandoned and copending application Ser. No. 620,905, filed Oct. 8, 1975, among others. Among the many known uses for anaerobic compositions are thread-locking, impregnation, gasketing, structural adhesives, and manufacture of tapes.

The disclosures of all the above patents and applications are incorporated herein by reference.

The compositions disclosed in all the preceding patents and applications share the characteristic that hydroperoxides are typically relied upon to provide effective initiation while not significantly degrading the stability, i.e., shelf life, of the composition.

Clearly, a compound offering a viable alternative to hydroperoxides would be a very useful and valuable addition to anaerobic adhesive technology.

THE INVENTION

There is now provided a new initiator of free radical polymerization in anaerobic systems. This initiator, in its preferred (hydroxy) form, is essentially equivalent in activity and stability to the most preferred of the hydroperoxides, i.e., cumene hydroperoxide, and may also have the advantage of causing less dermatitic irritation. Accordingly, the present invention relates to a polymerizable adhesive or sealant composition having anaerobic curing properties, comprising:

a. an anaerobically curable monomer; and
b. about 0.01 to about 10% by weight of the composition of a peroxide of the formula

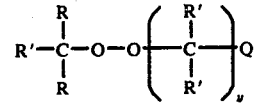

wherein R is selected from the group consisting of $C_1$ to about $C_{10}$ alkyl, alkenyl, cycloalkyl and cycloalkenyl and $C_6$ to about $C_{15}$ aryl, aralkyl and alkaryl; R' is hydrogen or R; y is 2 or 3; and Q is a polar moiety.

Most often, Q will be selected from the group consisting of hydroxyl, amino, halo, nitro, nitrile, carboxyl, sulfo, sulfino and mercapto. Other polar groups may also be used, provided they do not either deactivate or destabilize the peroxide. The composition may advantageously also contain any of a variety of additional materials, such as accelerators (e.g., benzoic sulfimide, alkyl-aryl amines), stabilizers (e.g., quinoid compounds), reactive diluents, thickeners, dyes, etc.

The invention also embraces a process for adhering or sealing surfaces which comprises applying to at least one of said surfaces the above polymerizable composition, then placing said surfaces in abutting relationship, thereby excluding oxygen and causing the composition to cure, i.e., polymerize.

DETAILED DESCRIPTION OF THE INVENTION

As has been stated, this invention relates to the replacement of the traditionally used hydroperoxides with the initiator of this invention. The key to the success of this initiator is its ability to provide essentially the same characteristics of satisfactory initiation rate balanced with stability which had previously made hydroperoxides desirable in certain monomeric systems, e.g., anaerobically curing systems. This invention also contemplates, of course, the substitution of this initiator for hydroperoxides in other systems where they have come to be preferred.

The initiator of this invention conforms to the formula

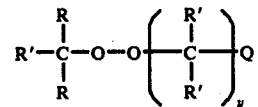

wherein R is selected from the group consisting of $C_1$ to about $C_{10}$ alkyl, alkenyl, cycloalkyl, and cycloalkenyl, and $C_6$ to about $C_{15}$ aryl, aralkyl and alkaryl; R' is hydrogen or R; y is 2 or 3; and Q is usually a polar moiety selected from the group consisting of hydroxyl, amino, halo, nitro, nitrile, carboxyl, sulfo, sulfino and mercapto. Preferably, R and R' are $C_1$ to about $C_5$ alkyl or cycloalkyl. In general, however, R and R' are not deemed critical and therefore may be any radical, both substituted and unsubstituted, which does not interfere significantly with the functioning of the initiator for its intended purpose.

Without intending to be bound to any particular theory, it is believed that polar group Q functions by facilitating cleavage of the peroxide bond, either by electron attraction or by hydrogen bonding to form a ring structure. Which of these possible mechanisms operates will, of course, depend upon which radical is selected for Q. In some cases, e.g., Q is hydroxyl, it is possible for both mechanisms to operate simultaneously. The precise nature of Q does not appear to be critical, provided that it is sufficiently polar to facilitate the cleavage of the peroxide bond, and does not otherwise interfere with the activity or stability of the initiator. Q is preferably hydroxyl, amino or carboxyl, most preferably, hydroxyl.

Within the limits given above, selection of $y$ is deemed to be a matter of choice. If $y$ were 1, the peroxide would tend to be unstable. If $y$ were more than 3, the polar group would probably be too distant from the peroxide group to affect it significantly.

Determination of the optimum concentration of initiator for any given adhesive formulation is within the skill of the art. In general, however, the initiator of this invention will be used in a concentration of about 0.01 to about 10%, preferably about 1 to about 5%, by weight of the adhesive composition.

The initiator of this invention is generally useful in any free radical initiated anaerobic monomer systems to replace hydroperoxides (e.g., cumene hydroperoxide, tert.-butyl hydroperoxide, methylethyl ketone hydroperoxide), peresters (e.g., tert.-butyl perbenzoate and others which hydrolyze to hydroperoxides), and peroxides of such activity level as would permit a stable adhesive formulation to be prepared. Thus, this initiator is not limited to any particular monomer, provided only that the cure of the given monomer is free radical-initiated. Likewise, the initiator of this invention may optionally be added to an anaerobic monomer system to supplement a free radical initiator of a different type (e.g., an ultraviolet, mercaptan or diazonium initiator) which may already be present, provided, of course, that the initiators are compatible with each other. By so doing, enhanced cure speed may be obtained without sacrifice in stability.

The selection of monomers is deemed to be a matter of choice and within the area of ordinary skill and routine experimentation. The preferred monomers, however, are those containing polymerizable acrylate (including alkyl acrylate, e.g., methacrylate) functionality. As has been stated, adhesive and sealant compositions based on such monomers are well known. Among the most preferred monomers are those acrylate-terminated compounds containing one, and preferably multiple, urethane linkages in the backbone, in a ring structure incorporated in the backbone, or pendant from the backbone. For convenience, these are all referred to herein as "urethane-acrylates."

Among the most desirable of such monomers are those disclosed by Gorman et al. in U.S. Pat. No. 3,425,988. These materials may be regarded as the reaction product of a polyisocyanate (e.g., toluene diisocyanate) with a mono-acrylate having a reactive hydrogen atom in the alcoholic portion thereof (e.g., hydroxypropyl methacrylate).

While the Gorman et al. patent should be consulted for details, in essence the preparation of the Gorman et al. monomers involves the reaction of a monofunctionally substituted alkyl or aryl acrylate ester containing an active hydrogen atom on the functional substituent. This monofunctional, acrylate-terminated material is reacted with an organic polyisocyanate in suitable proportions so as to convert essentially all of the isocyanate groups to urethane or ureide groups. The monofunctional alkyl and aryl acrylate esters are preferably the acrylates and methacrylates containing hydroxy or amino functional groups on the nonacrylate portion thereof. Acrylate esters suitable for use have the formula

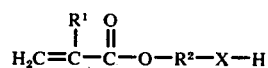

wherein X is selected from the group consisting of -O- and

$R^3$ is selected from the group consisting of hydrogen and lower alkyl of 1 through 7 carbon atoms; $R^1$ is selected from the group consisting of hydrogen, chlorine and methyl and ethyl radicals; and $R^2$ is a divalent organic radical selected from the group consisting of lower alkylene of 1 through 8 carbon atoms, phenylene and naphthylene. These groups, upon proper reaction with a polyisocyanate, yield a sealant monomer of the following general formula:

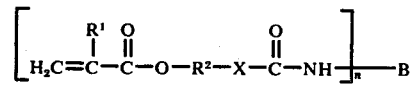

wherein $n$ is an integer from 2 to about 6; B is a polyvalent organic radical selected from the group consisting of alkyl, alkenyl, cycloalkyl, cycloalkenyl, aryl, arlakyl, alkaryl and heterocyclic radicals both substituted and unsubstituted; and $R^1$, $R^2$ and X have the meanings given above.

The hydroxy- and amine-containing materials suitable for use in the preparation of the above monomeric products are examplified by but not limited to such materials as hydroxyethyl acrylate, hydroxyethyl methacrylate, aminoethyl methacrylate, 3-hydroxypropyl methacrylate, aminopropyl methacrylate, hydroxyhexyl acrylate, t-butylaminoethyl methacrylate, hydroxyoctyl methacrylate, and the like.

The preferred polyisocyanates which may be used in preparing these monomers comprise the higher alkenyl diisocyanates, the cycloalkenyl diisocyanates and the aromatic diisocyanates containing more than 8 carbon atoms and preferably from 15 to 30 carbon atoms, such as, for example, octamethylene diisocyanate, durene diisocyanate, and 4,4'-diphenyl diisocyanate.

The reactions may be accomplished in the presence or absence of diluents. Preferably, diluents which include the hydrocarbons, such as aliphatic, cycloaliphatic and aromatic hydrocarbons, for example, benzene, toluene, cyclohexane, hexane, heptane and the like, are employed, but other diluents, such as methylisobutyl ketone, diamyl ketone, isobutyl methacrylate, and cyclohexyl methacrylate can also be beneficially utilized if desired, especially where complete compatibility with the sealant system is desired.

The temperature employed in the reaction may also vary over a wide range. Where the components are combined in approximately chemical equivalent amounts or with slight excess of the isocyanate reactant, useful temperatures may vary from room temperature or below, e.g., 10° C. to 15° C., up to and including temperatures of 100° C. to 175° C. Where reacting the simpler isocyanates, the components are preferably combined at or near room temperature, such as temperatures ranging from 20° C. to 30° C. In the preparation of the high molecular weight isocyanate adducts using an excess of the isocyanate, the reactants may be combined at room temperature or preferably heated at temperatures ranging from about 40° C. to about 150° C. Reactions conducted at about 90° C. to 120° C. have been found to proceed quite smoothly.

Various other useful urethane-acrylate type monomers have been developed recently by Baccei and are described in the patent applications mentioned above. These monomers may be viewed as one-component polymerizable block copolymers (prepolymers) having rigid and flexible segments. This is achieved by the chemical linking of precursor "prepolymers" which are subsequently "capped" with acrylate, e.g., methacrylate, functionality.

Other useful monomers, not containing urethane linkages, are those acrylates derived from bisphenol-A, such as bisphenol-A dimethacrylate, hydrogenated bisphenol-A dimethacrylate and ethoxylated bisphenol-A dimethacrylate.

Still other useful and highly preferred monomers are the alkylene glycol diacrylates having the general formula:

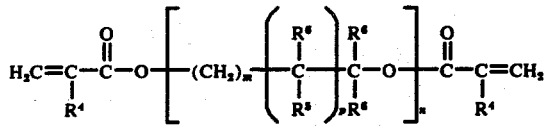

wherein $R^6$ represents a radical selected from the group consisting of hydrogen, lower alkyl of 1–4 carbon atoms, hydroxyalkyl of 1–4 carbon atoms, and

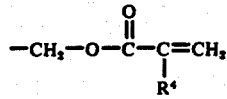

$R^4$ is a radical selected from the group consisting of hydrogen, halogen, and lower alkyl of 1–4 carbon atoms; $R^5$ is a radical selected from the group consisting of hydrogen, —OH and

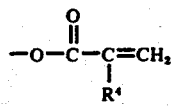

$m$ is an integer equal to at least 1, e.g., from 1 to 8 or higher, for instance, from 1 to 4; $n$ is an integer equal to at least 1, for example, 1 to 20 or more; and $p$ is 0 or 1.

Typical of the latter monomers are mono-, di-, tri, tetra- and polyethylene glycol dimethacrylate and the corresponding diacrylates; di(pentamethylene glycol) dimethacrylate; tetraethylene glycol di(chloroacrylate); diglycerol diacrylate; diglycerol tetramethacrylate; butylene glycol dimethacrylate; neopentyl glycol diacrylate; and trimethylopropane triacrylate.

While di- and other polyacrylate esters — and particularly the polyacrylate esters described in the preceding paragraphs — have been found particularly desirable, monofunctional acrylate esters (esters containing one acrylate group) also may be used. When dealing with monofunctional acrylate esters, it is highly preferable to use an ester which has a relatively polar alcoholic moiety. Such materials are less volatile than low molecular weight alkyl esters and, more important, the polar group tends to provide intermolecular attraction during and after cure, thus producing more desirable cure properties, as well as a more durable sealant or adhesive. Most preferably the polar group is selected from the group consisting of labile hydrogen, heterocyclic ring, hydroxy, amino, cyano, and halogen polar groups. Typical examples of compounds within this category are cyclohexyl methacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

Polymerization accelerators may also be advantageously included. Such accelerators include a variety of primary, secondary and tertiary organic amines (e.g., alkyl aryl amines, such as dimethyl para-toluidene), as well as acidic compounds such as sulfimides (e.g., benzoic sulfimide), all of which are known in the art. The accelerators may be used at a concentration range of about 0.1 to about 5%, preferably about 1 to about 2%, by weight of the composition. Also commonly included are inhibitors or stabilizers, usually of the quinone or hydroquinone families (e.g., hydroquinone, naphthoquinone, etc.). Inhibitors are typically used in concentrations of about 10 to about 1,000 parts per million, based on the adhesive composition. It will, of course, be appreciated that mixtures of accelerators and mixtures of inhibitors may be employed, if desired. Other known additives may also be included as desired to achieve specific properties. Such additives would include viscosity modifiers (e.g., thixotropic agents), fillers and dyes, among others.

The adhesive and sealant formulations of this invention may be prepared, if desired, with reactive diluents which are capable of copolymerizing with the various polymerizable materials. Typical of such diluents are the hydroxyalkyl acrylates, such as hydroxyethyl acrylate, hydroxypropyl acrylate, and the corresponding methacrylate compounds, including cyclohexyl methacrylate, and tetrahydrofurfuryl methacrylate. Other unsaturated reactive diluents, such as styrene and acrylonitrile, can also be used. When used, the concentration of such diluents should be less than about 60 percent by weight, and preferably about 40 to about 10 percent by weight of the composition.

It will also be understood that the curable composition of this invention can also be formulated as a two-part composition. In such a case, the initiator, or one of a combination of initiators, can comprise a second part which is combined with the first, monomeric, part at the point of use. Thus, the monomer can be applied to one surface to be joined, the initiator can be applied to a second surface, and the two surfaces then joined.

Similarly, an accelerator can be applied separately as a second part to one of the surfaces to be joined, e.g., as a primer. Suitable primers are those disclosed in U.S. Pat. No. 3,625,930 to Toback et al., and particularly those of the thiourea type disclosed in copending application Ser. No. 498,904, filed Aug. 20, 1974, now U.S. Pat. No. 3,970,505. Such primers are advantageously applied as a spray from dilute solvent solution to either or both surfaces to be joined.

It may be reasonable to accelerate the cure polymerization by application of moderate amounts of heat, e.g., 50° C. to 150° C. At temperatures above about 120° C., cure will typically be complete within about 10 minutes or less without primer.

EXAMPLE

The following example is presented by way of illustration and is not intended as a limitation on the invention. All concentrations are by weight.

EXAMPLE 1

Anaerobic adhesive formulations were prepared having the compositions shown in Table I (in parts by weight).

These adhesive formulations were tested by applying 2-3 drops to the threads of degreased, ⅜ inch – 24 iron bolts, then winding a mating iron nut onto the bolt and allowing the adhesive to cure at room temperature. After certain periods of cure, samples were tested for strength. "Break" strength is the force in inch-pounds needed to cause initial movement between the nut and bolt. "Prevail" strength is the force in inch-pounds needed to continue rotation at the point of 180° rotation from the break point. An accelerated stability test was conducted by storing the compositions at 82° C. and observing the time lapse until gellation. A time lapse of 30 minutes is considered adequate for commercial utility, and a time lapse of one hour or more is considered excellent. Test data are shown at the bottom of Table I.

Instron tester in a tensile shear test commonly used in the adhesive industry. Both formulations produce approximately equivalent tensile shear strength.

These data illustrate that a peroxide initiator of this invention is an effective initiator for anaerobic systems and is similar in over-all performance to the cumene hydroperoxide initiator of the prior art, and is substantially superior in performance to a structurally similar peroxide lacking the polar group.

What is claimed is:

1. An adhesive or sealant composition having anaerobic curing properties, comprising:
   a. an anaerobically curable monomer containing polymeryable acrylate functionality; and
   b. about 0.01 to about 10% by weight of the composition of a peroxide of the formula

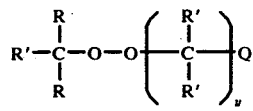

wherein
R is selected from the group consisting of $C_1$ to about $C_{10}$ alkyl, alkenyl, cycloalkyl, and cycloalkenyl and $C_6$ to about $C_{15}$ aryl, aralkyl and alkaryl; R' is hydrogen or R; y is 2 or 3; and Q is a polar moiety selected from the group consisting of hydroxyl, amino, halo, nitro, nitrile, carboxyl, sulfo, sulfino and mercapto.

2. The composition of claim 1 wherein Q is hydroxyl.

3. The composition of claim 1 wherein R' is R and R is selected from the group consisting of $C_1$ to about $C_5$ alkyl and cycloalkyl.

4. The composition of claim 3 wherein y is 2 and R' is hydrogen.

5. The composition of claim 1 wherein the peroxide has the formula

TABLE I

| Formulation | | A | B | C | D | E | F | G | H | I | J | K |
|---|---|---|---|---|---|---|---|---|---|---|---|---|
| Polyethylene glycol dimethacrylate (MW approximately equal to 330) | | 91.4 | 91.4 | 91.4 | 96.0 | 96.0 | 96.0 | 93.5 | 93.5 | 93.5 | 3.2 | 3.2 |
| Reaction product of 2 mols of hydroxypropyl methacrylate with one mole of methylene diisocyanate | | | | | | | | | | | 56.5 | 56.5 |
| Triethylene glycol dimethacrylate | | | | | | | | | | | 26.5 | 26.5 |
| Hydroxypropyl methacrylate | | | | | | | | | | | 4.5 | 4.5 |
| Acrylic acid | | | | | | | | | | | 5.3 | 5.3 |
| Tributyl amine | | 1.8 | 1.8 | 1.8 | | | | | | | | |
| Dimethyl-para-toluidene | | | | | .3 | .3 | .3 | | | | | |
| Dimethyl-ortho-toluidene | | | | | | | | .3 | .3 | .3 | | |
| Diethyl-para-toluidene | | | | | | | | .6 | .6 | .6 | | |
| Stabilizers | | .2 | .2 | .2 | 1.2 | 1.2 | 1.2 | 2.0 | 2.0 | 2.0 | | |
| Benzoic sulfimide | | | | | .4 | .4 | .4 | .4 | .4 | .4 | .4 | .4 |
| Cumene hydroperoxide | | 6.7 | | | 3.3 | | | 3.0 | | | 2.7 | |
| Di-tert.-butyl peroxide | | | | 6.7 | | | 3.3 | | | 3.0 | | |
| Tert.-butyl-hydroxyethyl peroxide | | | 6.7 | | | 3.3 | | | 3.0 | | | 2.7 |
| Strength, Break/Prevail | 1-hr. cure | 1/0 | 3/1 | 0/0 | | | | 160/190 | 120/210 | 0/0 | | |
| | 2-hr. cure | | | | 110/210 | 40/30 | 0/0 | | | | | |
| | 24-hr. cure | 90/130 | 70/80 | 0/0 | 110/140 | 85/130 | 0/0 | 120/130 | 60/180 | 8/2 | | |
| Stability at 82° C., minutes | | more than 180 | more than 180 | more than 180 | 40 | 135 | 0/0 | more than 100 | more than 180 | more than 180 | more than 180 | more than 180 |

Formulations J and K are used to adhere steel lap strips together. The strips are first primed with a known commercial tetramethyl thiourea primer. The bond area is 2 square inches and the cure time is 24 hours at room temperature. The strips are pulled apart with an

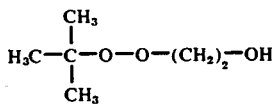

6. The composition of claim 1 wherein the concentration of the peroxide is about 0.05 to about 5% by weight of the composition.

7. The composition of claim 1 wherein the monomer has the formula

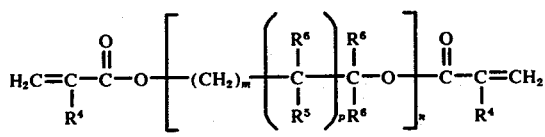

wherein $R^6$ represents a radical selected from the group consisting of hydrogen, lower alkyl of 1–4 carbon atoms, hydroxy alkyl of 1–4 carbon atoms, and

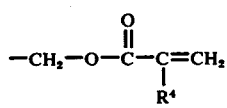

$R^4$ is a radical selected from the group consisting of hydrogen, halogen, and lower alkyl of 1–4 carbon atoms; $R^5$ is a radical selected from the group consisting of hydrogen, —OH and

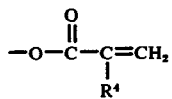

$m$ is an integer equal to at least 1; $n$ is an integer equal to at least 1; and $p$ is 0 or 1.

8. The composition of claim 7 wherein the monomer is polyethylene glycol dimethacrylate.

9. The composition of claim 7 wherein the monomer is butylene glycol dimethacrylate.

10. The composition of claim 1 wherein the monomer has the formula

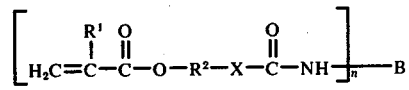

wherein $n$ is an integer from 2 to about 6; B is a polyvalent organic radical selected from the group consisting of alkyl, alkenyl, cycloalkyl, cycloalkenyl, aryl, aralkyl, alkaryl and heterocyclic radicals both substituted and unsubstituted; and $R^1$ is selected from the group consisting of hydrogen, chlorine and methyl and ethyl radical; $R^2$ is a divalent organic radical selected from the group consisting of lower alkylene of 1 through 8 carbon atoms, phenylene and naphthylene, and X is selected from the group consisting of —O— and

and $R^3$ is selected from the group consisting of hydrogen and lower alkyl of 1 through 7 carbon atoms.

11. The composition of claim 1 wherein the monomer comprises a urethane-acrylate-capped polybutadiene polyol or polyamine.

12. The composition of claim 1 wherein the monomer comprises a urethane-acrylate-capped poly(methylene) ether polyol.

13. The composition of claim 1 wherein the monomer comprises a urethane-acrylate-capped vinyl grafted poly(alkylene) ether polyol.

14. The composition of claim 1 which contains in addition an accelerator of free radical polymerization.

15. The composition of claim 14 wherein the accelerator is an alkyl aryl amine.

16. The composition of claim 14 wherein the accelerator is a sulfimide.

17. The composition of claim 16 wherein the accelerator is benzoic sulfimide.

18. The composition of claim 1 containing as an accelerator a mixture of one or more amines with a sulfimide.

19. The composition of claim 1 which contains in addition an inhibitor of free radical polymerization.

20. A method of adhering or sealing surfaces comprising applying to at least one of said surfaces the composition of claim 1, then placing said surfaces in abutting relationship and permitting the composition to cure.

* * * * *